US011182169B1

(12) United States Patent
Sodani

(10) Patent No.: US 11,182,169 B1
(45) Date of Patent: *Nov. 23, 2021

(54) DATA TRANSMISSION BETWEEN MEMORY AND ON CHIP MEMORY OF INFERENCE ENGINE FOR MACHINE LEARNING VIA A SINGLE DATA GATHERING INSTRUCTION

(71) Applicant: Marvell Asia Pte, Ltd., Singapore (SG)

(72) Inventor: Avinash Sodani, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/087,556

(22) Filed: Nov. 2, 2020

Related U.S. Application Data

(63) Continuation of application No. 16/420,103, filed on May 22, 2019, now Pat. No. 10,891,136, which is a continuation-in-part of application No. 16/226,508, filed on Dec. 19, 2018.

(60) Provisional application No. 62/675,076, filed on May 22, 2018.

(51) Int. Cl.
```
G06F 9/38       (2018.01)
G06F 9/30       (2018.01)
G06N 20/00      (2019.01)
G06F 15/78      (2006.01)
G06N 20/10      (2019.01)
```

(52) U.S. Cl.
CPC ........ *G06F 9/3877* (2013.01); *G06F 9/30043* (2013.01); *G06F 15/7814* (2013.01); *G06F 15/7821* (2013.01); *G06N 20/00* (2019.01); *G06N 20/10* (2019.01)

(58) Field of Classification Search
CPC .......................... G06F 9/30043; G06F 9/3877
See application file for complete search history.

(56) References Cited

U.S. PATENT DOCUMENTS

| 6,128,638 | A | 10/2000 | Thomas |
| 6,200,940 | B1 | 3/2001 | Vitomir |
| 6,282,583 | B1 | 8/2001 | Pincus et al. |
| 6,504,954 | B1 | 1/2003 | Goldstein |
| 6,577,312 | B2 | 6/2003 | Deering et al. |

(Continued)

OTHER PUBLICATIONS

NanoMesh: An Asynchronous Kilo-Core System-on-Chip, Tse, et al. 2013 19th IEEE International Symposium on Asynchronous Circuits and Systems 10 pages.

*Primary Examiner* — Jyoti Mehta

(57) ABSTRACT

A system to support data gathering for a machine learning (ML) operation comprises a memory unit configured to maintain data for the ML operation in a plurality of memory blocks each accessible via a memory address. The system further comprises an inference engine comprising a plurality of processing tiles each comprising one or more of an on-chip memory (OCM) configured to load and maintain data for local access by components in the processing tile. The system also comprises a core configured to program components of the processing tiles of the inference engine according to an instruction set architecture (ISA) and a data streaming engine configured to stream data between the memory unit and the OCMs of the processing tiles of the inference engine wherein data streaming engine is configured to perform a data gathering operation via a single data gathering instruction of the ISA at the same time.

19 Claims, 3 Drawing Sheets

(56) References Cited

U.S. PATENT DOCUMENTS

| | | | |
|---|---|---|---|
| 6,838,663 B2 | | 1/2005 | Coon et al. |
| 8,583,896 B2 | * | 11/2013 | Cadambi ............. G06F 15/7821 |
| | | | 712/27 |
| 9,015,217 B2 | | 4/2015 | Arnold et al. |
| 10,380,063 B2 | | 8/2019 | Tang et al. |
| 11,106,432 B2 | | 8/2021 | Mangnall et al. |
| 2017/0228345 A1 | | 8/2017 | Gupta et al. |
| 2017/0351642 A1 | | 12/2017 | Omtzigt |
| 2018/0046458 A1 | | 2/2018 | Kuramoto |
| 2018/0114114 A1 | | 4/2018 | Molchanov et al. |
| 2018/0189675 A1 | * | 7/2018 | Nurvitadhi ............ G06F 16/285 |
| 2018/0260220 A1 | | 9/2018 | Lacy et al. |
| 2018/0286016 A1 | | 10/2018 | Bar-On et al. |
| 2018/0293782 A1 | | 10/2018 | Benthin et al. |
| 2018/0307980 A1 | | 10/2018 | Barik et al. |
| 2018/0315158 A1 | | 11/2018 | Nurvitadhi et al. |
| 2019/0171604 A1 | * | 6/2019 | Brewer ................. G06F 9/3851 |
| 2020/0082198 A1 | | 3/2020 | Tao et al. |
| 2020/0242734 A1 | | 7/2020 | Wang et al. |
| 2021/0133911 A1 | | 5/2021 | Tao et al. |

* cited by examiner

```
arr_len = numptrs*8; //8 since each pointer is 8 bytes
ptr_array[arr_len-1:0] <= MEM(ddr_ptr_arr_addr[arr_len-1:0])
wraddr = ocm_addr;

for(i=0, p=0; i < numptrs; i++, p=0) {
    ptr[63:0] = ptr_array[p][63:0]; //each pointer is 8 bytes
    elem[linelen-1:0][6:0] <= (signed)? sign-extend(DDR(ptr)[linelen-1:0][7:0]):
                                        zero-extend(DDR(ptr)[linelen-1:0][7:0]);

for (tile in tileszgrp) { //from DMATaskMST
        memcpy(OCM(tilewaddr), elem, linelen);
    }
    wraddr += linelen;
}
```

FIG. 3

DATA TRANSMISSION BETWEEN MEMORY AND ON CHIP MEMORY OF INFERENCE ENGINE FOR MACHINE LEARNING VIA A SINGLE DATA GATHERING INSTRUCTION

CROSS-REFERENCE TO RELATED APPLICATIONS

This application claims the benefit of U.S. Provisional Patent Application No. 62/675,076, filed May 22, 2018, which is incorporated herein in its entirety by reference.

This application is a continuation of U.S. patent application Ser. No. 16/420,103, filed May 22, 2019, and entitled "Data Transmission Between Memory and On Chip Memory of Inference Engine for Machine Learning via a Single Data Gathering Instruction," which is a continuation-in-part of U.S. patent application Ser. No. 16/226,508, filed Dec. 19, 2018, and entitled "Single Instruction Set Architecture (ISA) Format for Multiple ISAs in Machine Learning Inference Engine." Both of which are incorporated herein in their entireties by reference.

BACKGROUND

Applied Machine Learning (ML) is a booming field that utilizes a cascade of layers of nonlinear processing units and algorithms for feature extraction and transformation with a wide variety of usages and applications. ML typically involves two phases, training, which uses a rich set of training data to train a plurality of machine learning models, and inference, which applies the trained machine learning models to actual applications. Each of the two phases poses a distinct set of requirements for its underlying infrastructures. Various infrastructures may be used, e.g., graphics processing unit (GPU), a central processing unit (CPU), a Field Programmable Gate Array (FPGA), an Application Specific Integrated Circuit (ASIC), etc. Specifically, the training phase focuses on, as a non-limiting example, GPU or ASIC infrastructures that scale with the trained models and retraining frequency, wherein the key objective of the training phase is to achieve high performance and reduce training time. The inference phase, on the other hand, focuses on infrastructures that scale with the applications, user, and data, and the key objective of the inference phase is to achieve energy (e.g., performance per watt) and capital (e.g., return on investment) efficiency.

Inference phase of ML is usually very computationally and data intensive. Unfortunately, as the input data and model sizes grow, data movement becomes a bottleneck and data processing increases because in order to perform simple processing, three operations or instructions are performed for each data, e.g., load, processing, and store. As the amount of data grows, performing these three operations or instructions becomes burdensome. Moreover, the current computing architecture is not scalable and are not well suited for ML and its applications, since a lot of time goes in loading and storing the data in comparison to processing the data.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 depicts an example of pseudocode that implements the data gathering instruction based on the input parameters according to one aspect of the present embodiments.

DETAILED DESCRIPTION

Figure 1:
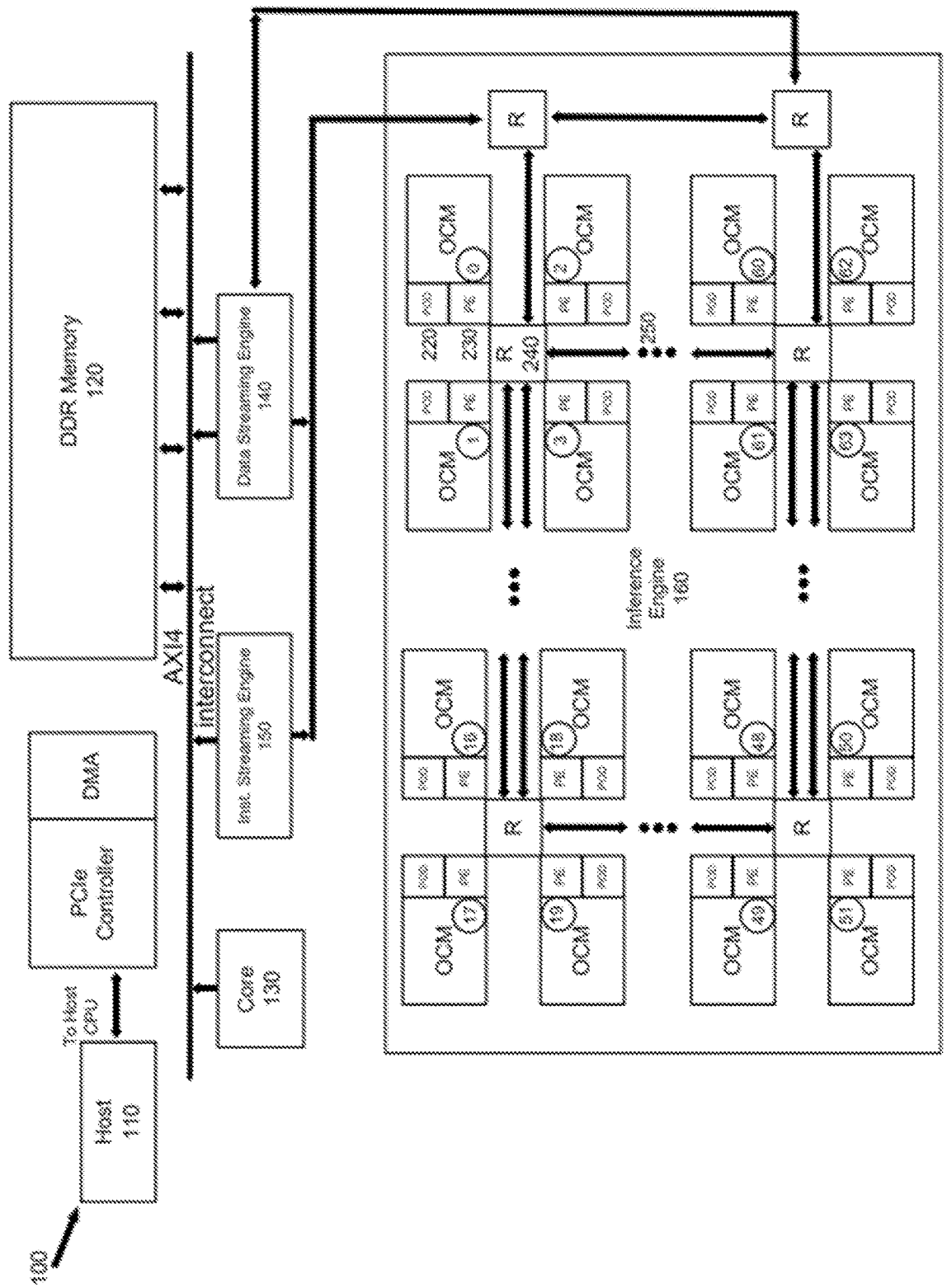
FIG. 1 depicts an example of diagram of a hardware-based programmable architecture configured to support inference acceleration for machine learning according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

FIG. 1 depicts an example of a diagram of a hardware-based programmable system/architecture 100 configured to support inference acceleration for machine learning. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

Each of the engines/programmable processors in the architecture 100 is a dedicated hardware block/component including one or more microprocessors and on-chip memory units storing software instructions programmed by a user for various machine learning operations. When the software instructions are executed by the microprocessors, each of the hardware components becomes a special purposed hardware component for practicing certain machine learning functions as discussed in detail below. In some embodiments, the architecture 100 is on a single chip, e.g., a system-on-chip (SOC).

In the example of FIG. 1, the architecture 100 may include a host 110 coupled to a memory (e.g., Double Data Rate or DDR) 120 and a core engine 130 via a PCIe controller and/or a direct memory access (DMA) module. The host 110 is a processing unit configured to receive or generate data to be analyzed and/or inferred by architecture 100 via machine learning. The DDR memory 120 includes a plurality of memory blocks each accessible via a memory address or pointer. The DDR memory 120 is coupled to a data streaming engine 140 configured to transfer/stream data between the DDR memory 120 and on-chip memory (OCM) 210 of an inference engine 160 discussed below via DDR-to-OCM DMA or DoD. The core 130 is a processing engine configured to receive and interpret a plurality of ML commands from the host 110 into instructions for a ML operation. The core 130 is also configured to process a plurality of performance non-critical operations, e.g., data/instruction preparatory work, data collection, data mapping, etc. The core 130 is coupled to an instruction-streaming engine 150, which accepts instructions destined for the inference engine 160 from the core 130 and distributes the instructions to the appropriate units within the inference engine 160. The inference engine 160 is configured to perform dense and sparse operations on received stream of data, e.g., to identify a subject in an image, by using the training data and executing the programming instructions received from the instruction-streaming engine 150.

In some embodiments, the inference engine 160 includes a two-dimensional computing array of processing tiles, e.g., tiles 0, . . . , 63, arranged in, e.g., 8 rows by 8 columns. Each processing tile (e.g., tile 0) includes at least one on-chip memory (OCM) e.g., 210, one POD engine (or POD), e.g., 220, and one processing engine/element (PE), e.g., 230. Here, the OCMs in the processing tiles are configured to receive data from the data streaming engine 140 in a streaming fashion. The OCMs 210 enable efficient local access to data per processing tile. The PODs 220 are configured to perform dense or regular computations on the received data in the OCMs 210, e.g., matrix operations such as multiplication, matrix manipulation, tan h, sigmoid, etc., and the PEs are configured to perform sparse/irregular computations and/or complex data shape transformations of the received data in the OCMs 210, e.g., memory transpose, addition operation, operations on irregular data structures (such as trees, graphs, and priority queues), respectively. Both the PODs 220 and the PEs 230 can be programmed according to the programming instructions received from the instruction-streaming engine 150 as discussed in detail below. Accordingly, the data is received and processed by each processing tile as an input data stream from the DDR memory 120 and the result is output by each processing tile as a stream of data to the DDR memory 120.

In some embodiments, a plurality of (e.g., four) processing tiles in the inference engine 160 together form a processing block or quad 250, e.g., processing tiles 0-3 form processing block 250, wherein the processing tiles within each processing block 250 are coupled to one another via a routing element 240. In some embodiments, all the routing elements are connected together as a mesh 260 of interconnect to connect the processing blocks in the same row or column as a two-dimensional array. It is appreciated that the number and/or types of components within each processing tile, the formation of the processing blocks, the number of processing tiles in each processing block, and the number of processing blocks in each row and column of the inference engine 160 as shown in FIG. 1 are exemplary and should not be construed as limiting the scope of the embodiments. In some embodiments, the same number of PE and POD may be used for each tile, and the same number of blocks may be used in each row and column in order to provide flexibility and scalability.

Figure 2:
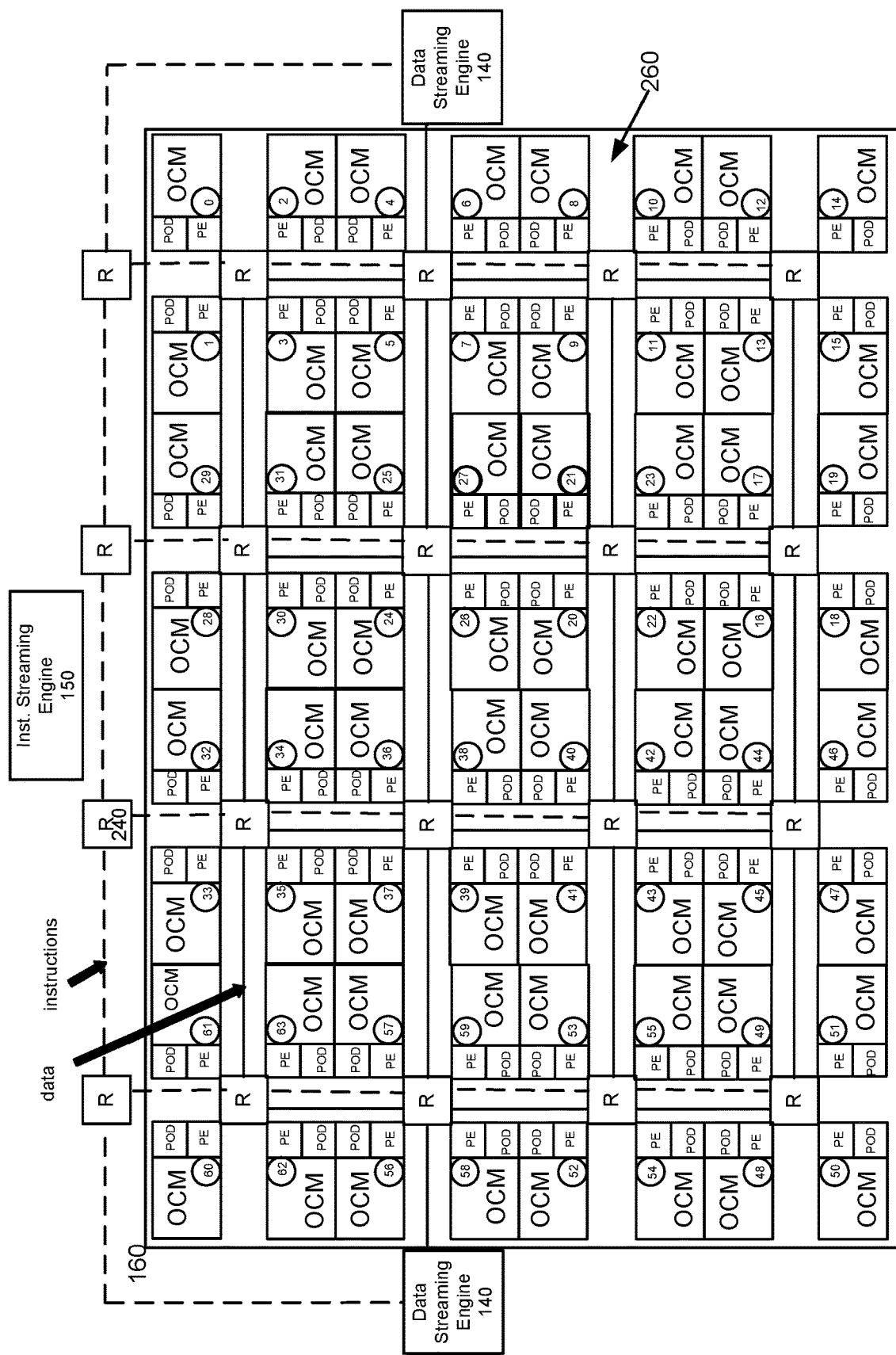
FIG. 2 depicts an example illustrating delivery of data and instructions from the data streaming engine and the instruction streaming engine to the inference engine, respectively, according to one aspect of the present embodiments.

FIG. 2 depicts an example illustrating delivery of data (represented by solid line) and instructions (represented by dotted lines) from the data streaming engine 140 and the instruction streaming engine 150 to the inference engine 160, respectively. In some embodiments, the instructions are sent from the instruction streaming engine 150 with a tile mask, indicating which processing tiles the instructions should be delivered to. Each router 240 is configured to check the tile mask to determine whether each instruction should be sent to one or more connected processing tiles or to a downstream router so that the instructions are always delivered to all the intended processing tiles in the right order. In some embodiments, each router 240 is also configured to check if there is enough buffer space in the processing tiles and/or the downstream router. Each router can start sending the next instructions only after the current instruction is sent to all intended processing tiles connected to the router and/or its downstream router.

In the example of FIGS. 1 and 2, the core 130 is configured to program various components, e.g., PODs 220 and PEs 230 of the inference engine 160 via a set of programming instructions translated according to an instruction set architecture (ISA) designed for efficient data processing in a data-path. In some embodiments, the ISA is a predominantly asynchronous instruction set, wherein each instruction in the ISA programs a state-machine, which then runs asynchronously with respect to other state machines. It is appreciated that a series of instructions do not necessarily imply sequential execution. In some embodiments, the ISA provides separate synchronizing instructions to ensure order between instructions where needed.

In some embodiments, the ISA enables programming of each component, e.g., PODs 220 or PEs 230, of the inference engine 160 in three steps: (i) programming one or more input data streams to the component to fetch input data into queues or registers associated with a computing block/operator of the component; (ii) programming the operator to perform the operations to be performed on the input data streams; and (iii) programming one or more output data streams to write the output of the operations into the OCM 210 of the inference engine 160.

In some embodiments, the ISA includes at least three classes of programming instructions: (i) programming instructions executed by the PODs 220, (ii) programming instructions executed by the PEs 230, and (iii) common programming instructions executed before the tasks are dispatched to either the PODs 220 or the PEs 230. Note that each of the programming instructions can be executed by one or more or all of the PODs 220 and/or PEs 230 at the same time.

In some embodiments, the ISA includes a data gathering instruction, e.g., DMA_DDR_Gather_to_OCM, wherein the data gathering instruction is configured to perform a data gathering operation to gather data from the DDR memory 120 and write the gathered data into the OCM 210 of each of one or more processing tiles via DoD by the data streaming engine 140. In some embodiments, the gathering instruction has the following format: DMA_DDR_Gather_to_OCM (ddr_pointer_array_address, OCM_addr, num_pointers, linelength). Here, the ddr_pointer_array_address is the address in the DDR memory 120 where pointers or addresses to the data lines to be gathered are stored. The number of pointers stored is given by num_pointers. The gathering instruction reads num_pointers number of pointers from ddr_pointer_array_address and then reads data lines pointed to by those pointers or addresses. The length of the data lines is given by linelength. In some embodiments, the one or more processing tiles which OCMs 210 have the gathered data written into can be specified by the core 130 via a separate programming instruction, e.g., DMATaskBcst, which informs the data streaming engine 140 of the OCMs of the processing tiles to be written into. In some embodiments, the data gathering instruction is configured to gather data from a plurality of memory blocks in the DDR memory 120 via a single instruction at the same time. For a non-limiting example, the plurality of memory blocks may be maintaining a large table across multiple memory blocks in the DDR memory 120. In some embodiments, the addresses/pointers to the plurality of memory blocks are maintained by the core 130 in an array of addresses, wherein each address can be, e.g., a 64-bit address. The array of addresses helps to create a two-level indirect reference to the entire list of the plurality of memory blocks from which the data is to be gathered in the data gathering instruction irrespective of the number of the memory blocks from which the data is to be gathered. In some embodiments, the array of pointers to the memory blocks from which data is to be gathered is contained in the DDR memory 120. In some embodiments, the address of the array of pointers to the data gathering memory blocks in the DDM memory 120 is provided as an input parameter to the single data gathering instruction by the core 130.

In some embodiments, in addition to the address of the array of pointers, the data gathering instruction may further take one or more of the following as its input parameters: number of pointers to the memory blocks from which data is to be gathered, e.g., numptrs, length of the line in each memory block to be loaded by each pointer to the memory block, e.g., linelen, which can be up to 1K bytes, address of the OCM 210 in each processing tile, e.g., ocm_addr, which the data gathered from the DDR memory 120 is to be written into sequentially, and a Boolean indicator, e.g., signed, which signifies if the data being transferred from the DDR memory 120 to the OCMs 210 of the processing tiles is either signed or unsigned. FIG. 3 depicts an example of pseudocode that implements the data gathering instruction based on the input parameters listed above, wherein the data is written into the OCMs of processing tiles as specified by the DMATaskBcst instruction.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system to support data gathering for a machine learning (ML) operation, comprising:
   a memory unit configured to maintain data for the ML operation, wherein the memory unit includes a plurality of memory blocks each accessible via a memory address;
   an inference engine comprising a plurality of processing tiles, wherein each processing tile comprises at least:
   an on-chip memory (OCM) configured to load and maintain data for local access by components in the processing tile; and
   one or more processing units configured to perform one or more computation tasks of the ML operation on the data in the OCM;
   a core configured to specify one or more processing tiles of the inference engine wherein the one or more OCMs of the one or more specified processing tiles have data written into;
   a programmable processor configured to stream data between the memory unit and the OCMs of the one or more specified processing tiles via a single data gathering instruction for the one or more processing units of the specified one or more processing tiles to perform the one or more computation tasks of the ML operation.

2. The system of claim 1, wherein:
the programmable processor is configured to
   gather data from one or more memory blocks of the plurality of memory blocks of the memory unit for the ML operation at the same time; and
   write the gathered data into the OCM of each of the specified one or more processing tiles for the one or more processing units of the specified one or more processing tiles to perform the one or more computation tasks of the ML operation.

3. The system of claim 2, wherein:
the memory unit is a double data rate (DDR) memory and the programmable processor is configured to write the gathered data into the OCM of each of the specified one or more processing tiles via DDR to OCM direct memory access (DMA).

4. The system of claim 1, wherein:
the core is configured to program components of the plurality of processing tiles of the inference engine by translating one or more commands from a host into a set of programming instructions for the ML operation according to an instruction set architecture (ISA) designed for data processing in a data-path.

5. The system of claim 1, wherein:
the core is configured to maintain the memory addresses to one or more memory blocks of the plurality of memory blocks of the memory unit in an array to create a two-level indirect reference to an entire list of the one or more memory blocks from which the data is to be streamed via the single data gathering instruction irrespective of a number of the one or more memory blocks from which the data is to be streamed.

6. The system of claim 5, wherein:
the array of the memory addresses to the one or more memory blocks from which data is to be streamed is contained in the memory unit.

7. The system of claim 6, wherein:
the core is configured to provide an address of the array of the memory addresses to the one or more memory blocks in the memory unit from which data is to be streamed as an input parameter to the single data gathering instruction.

8. The system of claim 7, wherein:
the single data gathering instruction further takes as its input parameters, in addition to the address of the array of addresses, number of pointers to the one or more memory blocks from which data is to be streamed.

9. The system of claim 7, wherein:
the single data gathering instruction further takes as its input parameters, length of a line in each memory block to be loaded by each pointer to the memory block.

10. The system of claim 7, wherein:
the single data gathering instruction further takes, as its input parameters, address of the OCM in each of the specified one or more processing tiles into which the data streamed from the memory unit is to be written into sequentially.

11. The system of claim 7, wherein:
the single data gathering instruction further takes, as its input parameters, a Boolean indicator, which signifies if the data being streamed from the memory unit to the OCMs of the specified one or more processing tiles is either signed or unsigned.

12. A method to support data gathering for a machine learning (ML) operation, comprising:
maintaining data in a memory unit for the ML operation, wherein the memory unit includes a plurality of memory blocks each accessible via a memory address;
specifying, by a core, one or more processing tiles among a plurality of processing tiles in an inference engine, wherein each processing tile comprises at least an on-chip memory (OCM) configured to load and maintain data for local access by components in the processing tile and one or more processing units configured to perform one or more computation tasks of the ML operation on the data in the OCM, wherein the one or more OCMs of the one or more specified processing tiles have data written into; and
streaming, by a programmable processor, data between the memory unit and the OCMs of the one or more specified processing tiles via a single data gathering instruction for the one or more processing units of the specified one or more processing tiles to perform the one or more computation tasks of the ML operation.

13. The method of claim 12, further comprising:
gathering data from one or more memory blocks of the plurality of memory blocks of the memory unit for the ML operation at the same time; and
writing the gathered data into the OCM of each of the specified one or more processing tiles for the one or more processing units of the specified one or more processing tiles to perform the one or more computation tasks of the ML operation.

14. The method of claim 13, wherein:
the memory unit is a double data rate (DDR) memory and the writing of the gathered data into the OCM of each of the specified one or more processing tiles is via DDR to OCM direct memory access (DMA).

15. The method of claim 12, further comprising:
programming components of the plurality of processing tiles of the inference engine by translating one or more commands from a host into a set of programming instructions for the ML operation according to an instruction set architecture (ISA) designed for data processing in a data-path.

16. The method of claim 12, further comprising:
maintaining the memory addresses to one or more memory blocks of the plurality of memory blocks of the memory unit in an array to create a two-level indirect reference to an entire list of the one or more memory blocks from which the data is to be streamed via the single data gathering instruction irrespective of a number of the one or more memory blocks from which the data is to be gathered streamed.

17. The method of claim 16, further comprising:
containing the array of the memory addresses to the one or more memory blocks from which data is to be streamed in the memory unit.

18. The method of claim 17, further comprising:
providing an address of the array of the memory addresses to the one or more memory blocks from which data is to be streamed in the memory unit as an input parameter to the single data gathering instruction.

19. The method of claim 18, further comprising:
including, in addition to the address of the array of addresses, as input parameters to the single data gathering instruction one or more of: number of pointers to the one or more memory blocks from which data is to be streamed, length of a line in each memory block to be loaded by each pointer to the memory block, address of the OCM in each of the specified one or more processing tiles into which the data streamed from the memory unit is to be written into sequentially, and a Boolean indicator, which signifies if the data being streamed from the memory unit to the OCMs of the specified one or more processing tiles is either signed or unsigned.

\* \* \* \* \*